(12) United States Patent
Sugita et al.

(10) Patent No.: US 10,605,891 B2
(45) Date of Patent: Mar. 31, 2020

(54) POSITIONING SYSTEM, POSITIONING METHOD, AND POSITIONING PROGRAM

(71) Applicant: MTI Ltd., Tokyo (JP)

(72) Inventors: Yuuya Sugita, Tokyo (JP); Ichiro Igari, Tokyo (JP)

(73) Assignee: MTI Ltd., Tokyo (JP)

( * ) Notice: Subject to any disclaimer, the term of this patent is extended or adjusted under 35 U.S.C. 154(b) by 378 days.

(21) Appl. No.: 14/894,665

(22) PCT Filed: May 29, 2014

(86) PCT No.: PCT/JP2014/064337
§ 371 (c)(1),
(2) Date: Nov. 30, 2015

(87) PCT Pub. No.: WO2014/192893
PCT Pub. Date: Dec. 4, 2014

(65) Prior Publication Data
US 2016/0109558 A1    Apr. 21, 2016

(30) Foreign Application Priority Data

May 31, 2013  (JP) .................................. 2013-115703

(51) Int. Cl.
*G01S 5/30* (2006.01)
*G01S 1/72* (2006.01)
*G01S 5/00* (2006.01)

(52) U.S. Cl.
CPC .................. *G01S 5/30* (2013.01); *G01S 1/72* (2013.01); *G01S 5/0045* (2013.01)

(58) Field of Classification Search
CPC ............. G01S 5/30; G01S 5/0045; G01S 1/72
See application file for complete search history.

(56) References Cited

U.S. PATENT DOCUMENTS

| | | | | |
|---|---|---|---|---|
| 4,176,338 A | * | 11/1979 | Spindel | .................. G01S 15/66 367/117 |
| 2001/0008393 A1 | * | 7/2001 | Valio | .................... G01S 5/0045 342/357.42 |

(Continued)

FOREIGN PATENT DOCUMENTS

| JP | H05-257837 A | 10/1993 |
|---|---|---|
| JP | H09-083608 A | 3/1997 |

(Continued)

OTHER PUBLICATIONS

International Search Report for International Patent Application No. PCT/JP2014/064337 filed May 29, 2014.

*Primary Examiner* — Hovhannes Baghdasaryan

(57) ABSTRACT

The purpose of the present invention is to reduce the introduction cost of an indoor positioning system using inaudible sound. A positioning system according to one embodiment includes a first acquisition unit, a second acquisition unit, and a positioning unit. The first acquisition unit acquires a reception log indicating that a fixed receiver receives signal source-specific inaudible sounds from multiple signal sources. The second acquisition unit acquires, from a storage unit, signal source information on multiple signal sources corresponding to a fixed receiver installed near a mobile terminal. Here, the signal source information contains information for identifying a signal source from inaudible sound, the transmission timing of inaudible sound at the signal source, and the location of the signal source.

15 Claims, 12 Drawing Sheets

(56) References Cited

U.S. PATENT DOCUMENTS

| | | | |
|---|---|---|---|
| 2006/0075131 A1* | 4/2006 | Douglas | G01S 5/0252 709/230 |
| 2006/0087474 A1* | 4/2006 | Do | G01S 1/024 342/386 |
| 2006/0125693 A1* | 6/2006 | Recker | G01S 5/14 342/458 |
| 2007/0290924 A1* | 12/2007 | McCoy | G06Q 10/087 342/464 |
| 2008/0008117 A1* | 1/2008 | Alizadeh-Shabdiz | G01S 5/02 370/328 |
| 2008/0263105 A1* | 10/2008 | Nakamura | H04L 43/0817 |
| 2009/0160705 A1* | 6/2009 | Matsuzaki | G01S 19/14 342/357.52 |
| 2012/0081250 A1* | 4/2012 | Farrokhi | G01S 5/0252 342/357.31 |
| 2013/0189953 A1* | 7/2013 | Mathews | H04W 12/06 455/411 |

FOREIGN PATENT DOCUMENTS

| | | |
|---|---|---|
| JP | H10-148670 A | 6/1998 |
| JP | 2005-321225 A | 11/2005 |
| JP | 2006-201151 A | 8/2006 |
| JP | 2009-229393 A | 10/2009 |
| JP | 2009-288245 | 12/2009 |
| WO | WO 2013/061268 A2 | 5/2013 |

* cited by examiner ically for positioning is required. For example, the above positioning system described in Patent Document 1 requires dedicated devices (position beacon transmitting device and position beacon receiving device) on both the transmission side and the reception side. Further, the transmission of beacons needs synchronizing. To do this, since there is a need to use a dedicated communication channel for ensuring exact time matching between devices, or to mount a very precise clock such as an atomic clock in each device, the cost is further increased.
POSITIONING SYSTEM, POSITIONING METHOD, AND POSITIONING PROGRAM

TECHNICAL FIELD

One aspect of the present invention relates to a system, method, and program for measuring the current location of a user indoors.

BACKGROUND ART

Conventionally, there have been a method using Wi-Fi and a method using inaudible sound (ultrasonic sound) as indoor positioning methods.

A Wi-Fi positioning system includes Wi-Fi access points and user mobile terminals. In this system, a mobile terminal receives radio waves emanating from multiple access points to estimate the current location using access point-specific information (e.g., MAC address) and a radio field strength pattern. However, the accuracy of this system is relatively low, which is about 5 m to 10 m, and even using a technique called SLAM (Simultaneous Localization and Mapping), the accuracy can be improved only up to about 2.5 m. Further, it is necessary to make a field survey and create a radio map in advance in order to use this system. With the construction or abolition of an access point, the radio map needs updating, and this increases the cost for map creation and maintenance.

In contrast, the accuracy of the system using inaudible sound can be improved up to about 50 cm or 1 m. In addition, the system has the advantage of eliminating the need for the radio map. As an example of such a system, there is an indoor positioning system described in Patent Document 1 mentioned below. This positioning system includes a position beacon transmitting device and a position beacon receiving device.

CITATION LIST

Patent Document

Patent Document 1: JP 2009-288245 A

DISCLOSURE OF THE INVENTION

Problem to be Solved by the Invention

Although the system using inaudible sound improves the accuracy and eliminates the need for the radio map, infrastructure development such as to install beacons dedicated for positioning is required. For example, the above positioning system described in Patent Document 1 requires dedicated devices (position beacon transmitting device and position beacon receiving device) on both the transmission side and the reception side. Further, the transmission of beacons needs synchronizing. To do this, since there is a need to use a dedicated communication channel for ensuring exact time matching between devices, or to mount a very precise clock such as an atomic clock in each device, the cost is further increased.

Therefore, it is desired to reduce the introduction cost of the indoor positioning system using inaudible sound.

Means for Solving the Problem

A positioning system according to one aspect of the present invention includes: a first acquisition unit for acquiring a reception log, indicating that a fixed receiver receives signal source-specific inaudible sounds from multiple signal sources, in association with a receiver ID of the fixed receiver; a second acquisition unit for acquiring, from a storage unit, signal source information on the multiple signal sources corresponding to the fixed receiver installed near a mobile terminal, wherein the signal source information contains information for identifying a signal source from inaudible sound, the transmission timing of inaudible sound at the signal source, and the location of the signal source; and a positioning unit which, when the mobile terminal receives multiple inaudible sounds, identifies multiple signal sources that emit the multiple inaudible sounds based on signal source information acquired by the second acquisition unit, and calculates the current location of the mobile terminal using the signal source information on the multiple identified signal sources, and a reception log of the multiple inaudible sounds at the mobile terminal.

A positioning method according to one aspect of the present invention is a positioning method executed by a positioning system including at least a fixed receiver, multiple signal sources, and a mobile terminal, the method including: a first acquisition step of acquiring a reception log, indicating that the fixed receiver receives signal source-specific inaudible sounds from the multiple signal sources, in association with a receiver ID of the fixed receiver; a second acquisition step of acquiring, from a storage unit, signal source information on the multiple signal sources corresponding to the fixed receiver installed near the mobile terminal, wherein the signal source information contains information for identifying a signal source from inaudible sound, the transmission timing of inaudible sound at the signal source, and the location of the signal source; and a positioning step in which, when the mobile terminal receives multiple inaudible sounds, multiple signal sources that emit the multiple inaudible sounds are identified based on signal source information acquired in the second acquisition step, and the current location of the mobile terminal is calculated using the signal source information on the multiple identified signal sources, and a reception log of the multiple inaudible sounds at the mobile terminal.

A positioning program according to one aspect of the present invention causes a computer system to execute: a first acquisition unit for acquiring a reception log, indicating that a fixed receiver receives signal source-specific inaudible sounds from multiple signal sources, in association with a receiver ID of the fixed receiver; a second acquisition unit for acquiring, from a storage unit, signal source information on the multiple signal sources corresponding to the fixed receiver installed near a mobile terminal, wherein the signal source information contains information for identifying a signal source from inaudible sound, the transmission timing of inaudible sound at the signal source, and the location of the signal source; and a positioning unit which, when the mobile terminal receives multiple inaudible sounds, identifies multiple signal sources that emit the multiple inaudible sounds based on signal source information acquired by the second acquisition unit, and calculates the current location of the mobile terminal using the signal source information on the multiple identified signal sources, and a reception log of the multiple inaudible sounds at the mobile terminal.

According to such an aspect, since the information for identifying a signal source from inaudible sound and the location of the signal source can be acquired from the storage unit, there is no need to embed these pieces of information in the inaudible sound. Since the transmission timing of inaudible sound at each signal source is also acquired from the storage unit, there is no need to synchronize inaudible sound between multiple signal sources. Since this leads to simplifying the mechanism of signal sources, the costs of many signal sources required to be installed can be suppressed by that amount. As a result, the introduction cost of the positioning system can be reduced as a whole.

In a positioning system according to another aspect of the present invention, the configuration may be such that the positioning unit determines a timer error between the fixed receiver and the mobile terminal from the reception log of inaudible sound at the fixed receiver acquired by the first acquisition unit and a reception log of inaudible sound at the mobile terminal, and calculates the current location of the mobile terminal using the transmission timing in consideration of the error, and a reception log of multiple inaudible sounds newly received at the mobile terminal.

In a positioning system according to still another aspect of the present invention, the mobile terminal may include the positioning unit.

In a positioning system according to yet another aspect of the present invention, the configuration may be such that the second acquisition unit includes a requesting unit provided in the mobile terminal and a responding unit provided in a server, the requesting unit transmits the receiver ID of the fixed receiver to the server, the responding unit acquires, from the storage unit, signal source information corresponding to the receiver ID and transmits the signal source information to the mobile terminal, and the requesting unit receives the signal source information acquired by the responding unit.

In a positioning system according to yet another aspect of the present invention, the server may include the first acquisition unit.

In a positioning system according to still another aspect of the present invention, the configuration may be such that the positioning unit includes a further positioning function to be executed when the mobile terminal receives one inaudible sound, and the further positioning function includes: a step of identifying, based on the signal source information, the location of one signal source that emits the one inaudible sound; a step of repeatedly determining a shift amount of Doppler shift of the one inaudible sound; and a step of estimating the location of the one signal source as the current location of the mobile terminal at a time point when the shift amount changes from a positive value to a negative value.

Effect of the Invention

According to one aspect of the present invention, the introduction cost of an indoor positioning system using inaudible sound can be suppressed.

MODE FOR CARRYING OUT THE INVENTION

Figure 1:
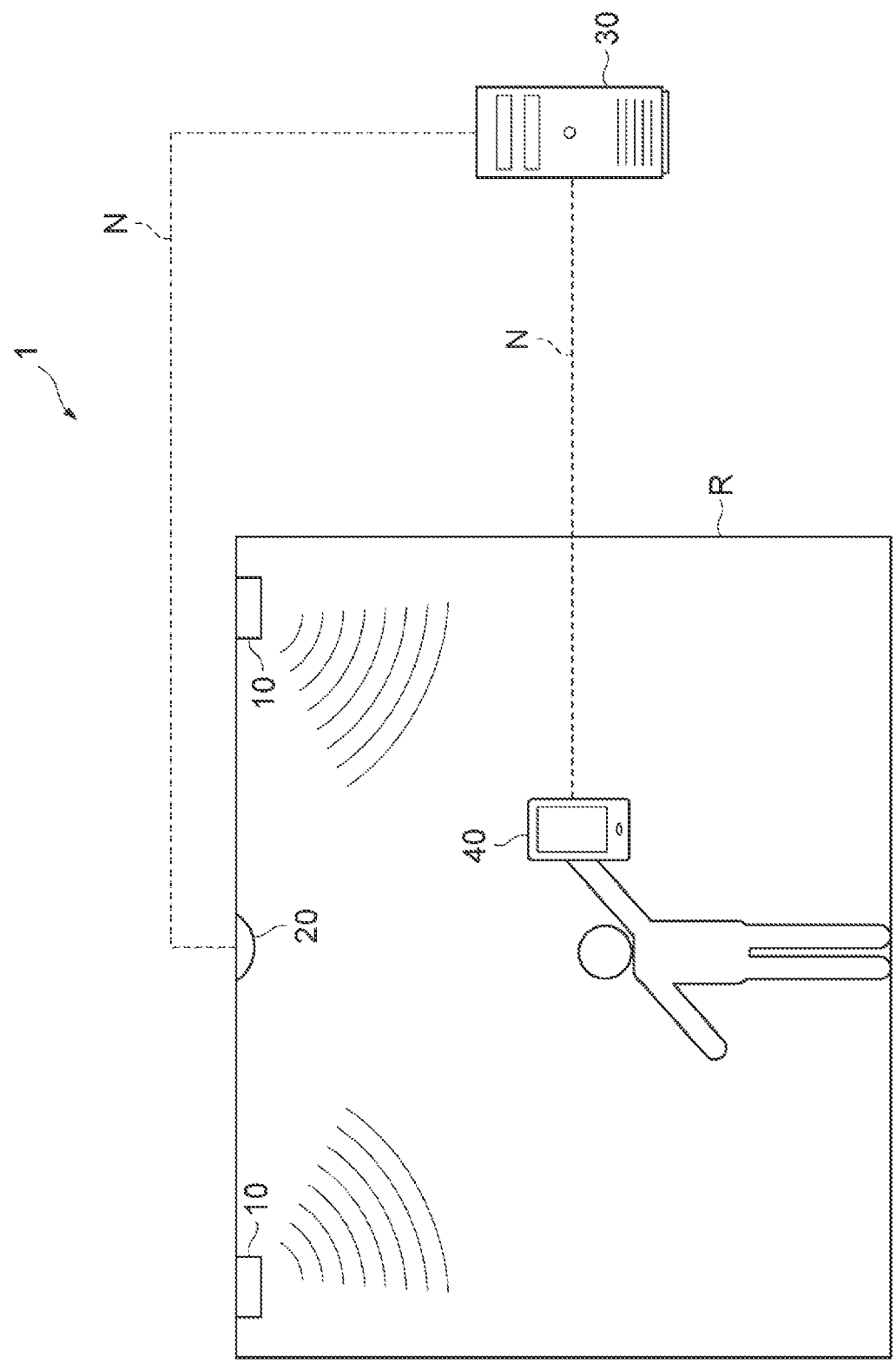
FIG. 1 is a diagram illustrating the general configuration of a positioning system according to a first embodiment.

Embodiments of the present invention will be described in detail below with reference to the accompanying drawings. Note that the same or equivalent elements in the description of the drawings are given the same reference numerals to omit redundant description.

First Embodiment

First, a positioning system 1 according to a first embodiment will be described. The positioning system 1 is a computer system for measuring the location of a user staying indoors. As illustrated in FIG. 1, the positioning system 1 includes beacons (signal sources) 10 and a fixed receiver 20 installed in indoor space R, a server 30, and a mobile terminal 40 carried by a user. The server 30 connects with the fixed receiver 20 and the mobile terminal 40 through a communication network N, respectively. In the positioning system 1, it is necessary to keep a time lag between devices within a predetermined range. As one means therefor, the fixed receiver 20, the server 30, and the mobile terminal 40 have a time-matching function using Network Time Protocol (NTP). A commonly used NTP server may be the server 30 or any other computer.

Note that the specific configuration of the communication network N is not particularly limited. For example, the communication network N may be constructed by either or both of a wired network and a wireless network (e.g., Wi-Fi). The communication network N may also be constructed by either or both of the Internet and the LAN.

Figure 2:
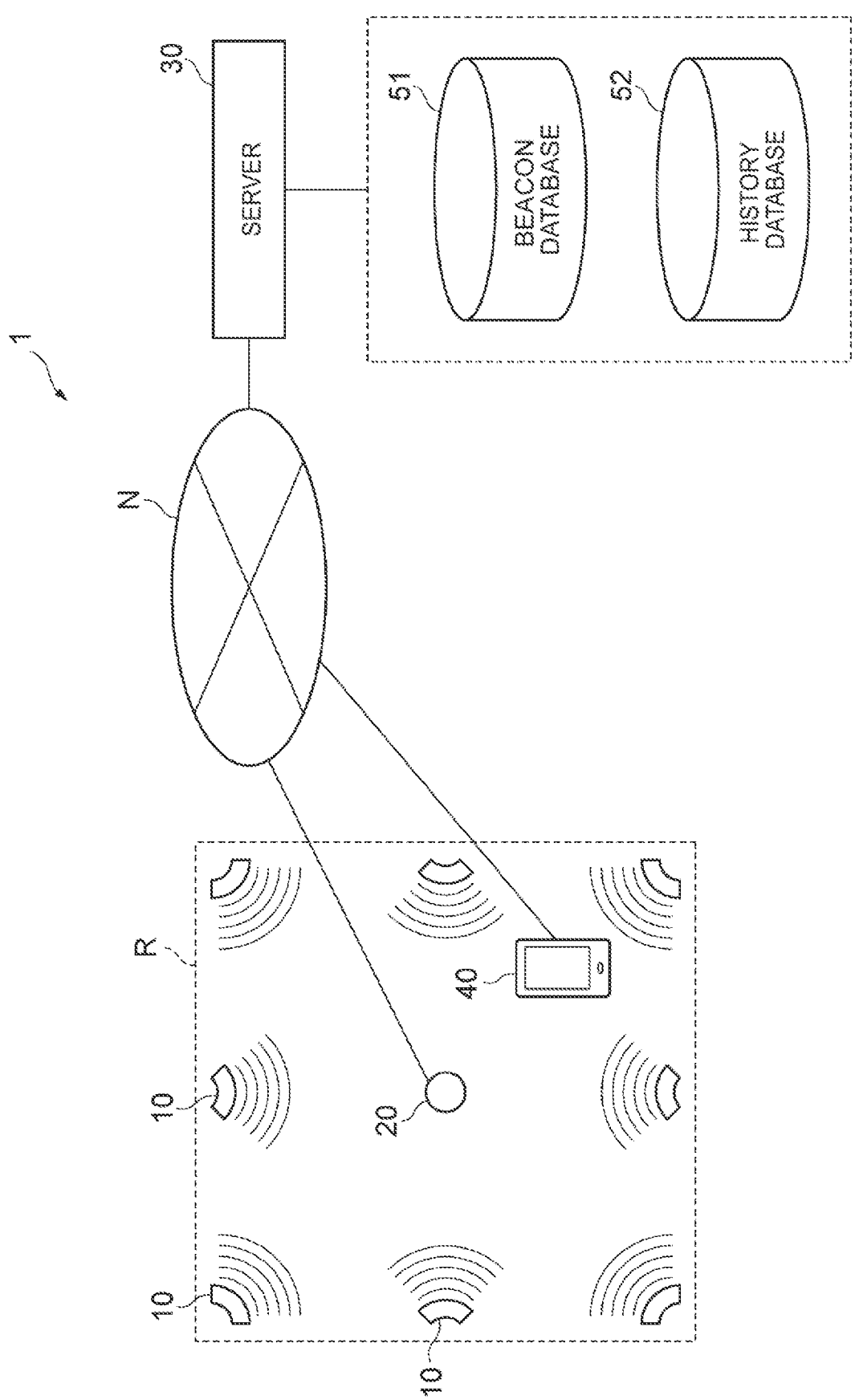
FIG. 2 is a diagram illustrating the general configuration of the positioning system according to the first embodiment.

In order to acquire where the user (mobile terminal 40) is in a space enclosed by walls, at least four beacons 10 and at least one fixed receiver 20 are required. For example, when these devices are placed in a 20 m square room, a total of eight beacons 10 are provided in four corners and substantially at the center of each wall of the room R as illustrated in FIG. 2, and one fixed receiver 20 is provided near the center of the room R. Of course, the installation mode of the beacons 10 and the fixed receiver 20 is not limited to this example, and it may be determined depending on the shape and dimensions of the room, the transmitting performance of the beacons 10, the receiving performance of the fixed receiver 20, and the like.

However, since one fixed receiver 20 can process inaudible sound from a relatively large number (e.g., ten or more) of beacons 10, the number of installed fixed receivers 20 is much smaller than the number of installed beacons 10. Since the fixed receiver 20 includes a processor for processing inaudible sound, a network interface, and the like, the fixed receiver 20 is more expensive than the beacon 10. However, since the number of installed fixed receivers can be suppressed, the introduction cost of the positioning system 1 can be reduced as a whole.

The beacon 10 is a device for emitting inaudible sound. Each individual beacon 10 is just a speaker with a player, which transmits the same inaudible sound signal from a crystal oscillator at fixed time intervals without synchronization with other beacons 10 (i.e., independently of the other beacons 10) and does not receive any signal.

The beacons 10 perform direct sequence spread spectrum (DSSS) on an inaudible sound signal of a specific frequency (e.g., 20000 Hz) to generate inaudible sound. Since each individual beacon 10 performs direct sequence spread spectrum using a unique spreading sequence different from those of the other beacons 10, the signal waveform of inaudible sound emitted from each beacon 10 is different from signal waveforms from the other beacons 10. Therefore, even when inaudible sounds from multiple beacons 10 temporally overlap, the multiple inaudible sounds can be separated on the receiving side, and hence the receiving side can identify the signal source of each individual inaudible sound.

A beacon database 51 is a device for storing information on each beacon 10. Each record of the beacon information (signal source information) contains at least items listed below. As mentioned above, since the spreading sequence is different from beacon to beacon, it can be said that the spreading sequence ID is the identifier of each beacon. Note that the spreading sequence itself may be used as the spreading sequence ID.

Spreading sequence ID used to uniquely identify each spreading sequence
Spreading sequence
Three-dimensional coordinates (x, y, z) indicative of the installation position of each beacon
Defining equation ($t_i = ai + b$) of the transmission timing of inaudible sound (transmission time from the beacon 10). Here, constant a indicates the time interval, constant b indicates the base time, and variable i indicates the number of times of transmission from the base time.

The fixed receiver 20 is a device for receiving inaudible sound from multiple near beacons 10. The fixed receiver 20 prestores beacon information corresponding to beacons 10 located near the own device (i.e., the signal sources of inaudible sound likely to be received). This means that the fixed receiver 20 holds a copy of part of the beacon database 51.

On that basis, the fixed receiver 20 searches for a spreading sequence corresponding to received inaudible sound to identify from which beacon 10 the inaudible sound is emitted. Further, the fixed receiver 20 acquires the reception time of the inaudible sound using a timer of the own device. Then, the fixed receiver 20 generates a reception log including a receiver ID for identifying the own device, the three-dimensional coordinates (x, y, z) indicative of the installation position of the own device, the identified spreading sequence ID, and the reception time, and transmits the reception log to the server 30. The fixed receiver 20 generates and transmits a reception log each time the fixed receiver 20 receives inaudible sound. Note that the receiver ID may be anything as long as it can uniquely identify the fixed receiver 20. For example, the receiver ID may be a MAC address.

Further, the fixed receiver 20 includes a wireless communication function such as Wi-Fi to communicate with a near mobile terminal 40. When a communication connection with a mobile terminal 40 approaching the fixed receiver 20 is established, the fixed receiver 20 transmits the receiver ID to the mobile terminal 40.

A history database 52 is a device for storing the reception log of each fixed receiver 20. As mentioned above, each record of the reception log contains at least the receiver ID, the three-dimensional coordinates (x, y, z) indicative of the installation position of the fixed receiver 20, the spreading sequence ID, and the reception time at the fixed receiver 20. Since each fixed receiver 20 generates a reception log each time the fixed receiver 20 receives, from any of the beacons 10, inaudible sound for one time, the log is accumulated in the history database 52.

The server 30 is a computer for providing, to a mobile terminal 40, information necessary for positioning in response to a request from the mobile terminal 40. The server 30 may be composed of one computer, or two or more computers.

The mobile terminal 40 is a computer carried by a user. The mobile terminal 40 includes a microphone for receiving inaudible sound, a function to communicate with the server 30, and a positioning function to be described later. There is a sophisticated mobile terminal (smartphone) as the mobile terminal 40, but the type of mobile terminal 40 is not particularly limited as long as it has these functions.

Figure 3:
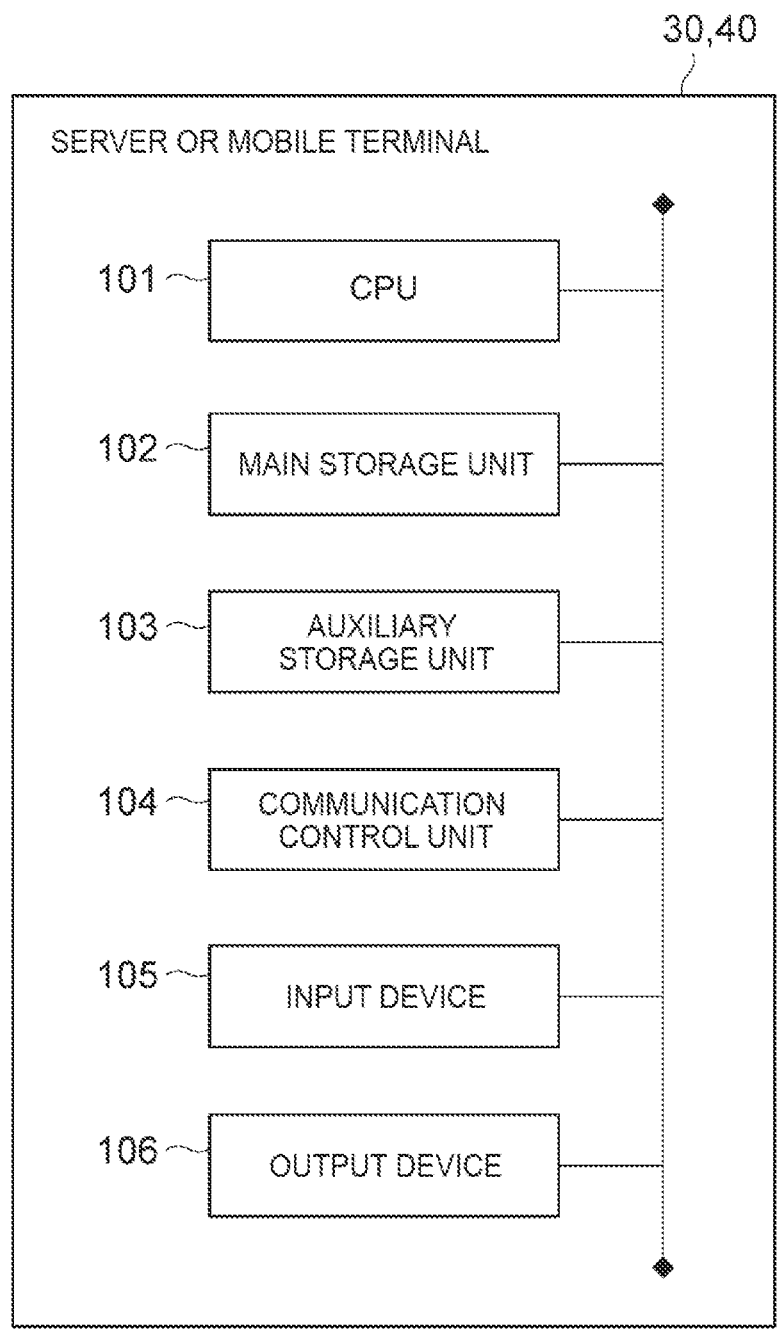
FIG. 3 is a diagram illustrating the hardware configuration of a server and a mobile terminal.

The basic hardware configuration of the server 30 and the mobile terminal 40 is illustrated in FIG. 3. The server 30 and the mobile terminal 40 are both configured to include a CPU 101 for executing an operating system and application programs, a main storage unit 102 composed of a ROM and a RAM, an auxiliary storage unit 103 composed of a hard disk and a flash memory, a communication control unit 104 composed of a network card or a wireless communication module, an input device 105 such as a keyboard, a mouse, a touch panel, a microphone, etc., and an output device 106 such as a display and a speaker.

Of course, embedded modules can be different between the mobile terminal 40 and the server 30. For example, it is considered that the mobile terminal 40 includes the touch panel as the input device 105, and the input device 105 of the server 30 is the keyboard and the mouse.

As will be described later, each functional component of the server 30 and the mobile terminal 40 is implemented in such a manner that predetermined software is read into the CPU 101 or the main storage unit 102, the communication control unit 104, the input device 105, and the output device 106, and the like are operated under control of the CPU 101 to read or write data in the main storage unit 102 or the auxiliary storage unit 103. Data and databases necessary for processing are stored in the main storage unit 102 or the auxiliary storage unit 103.

Figure 4:
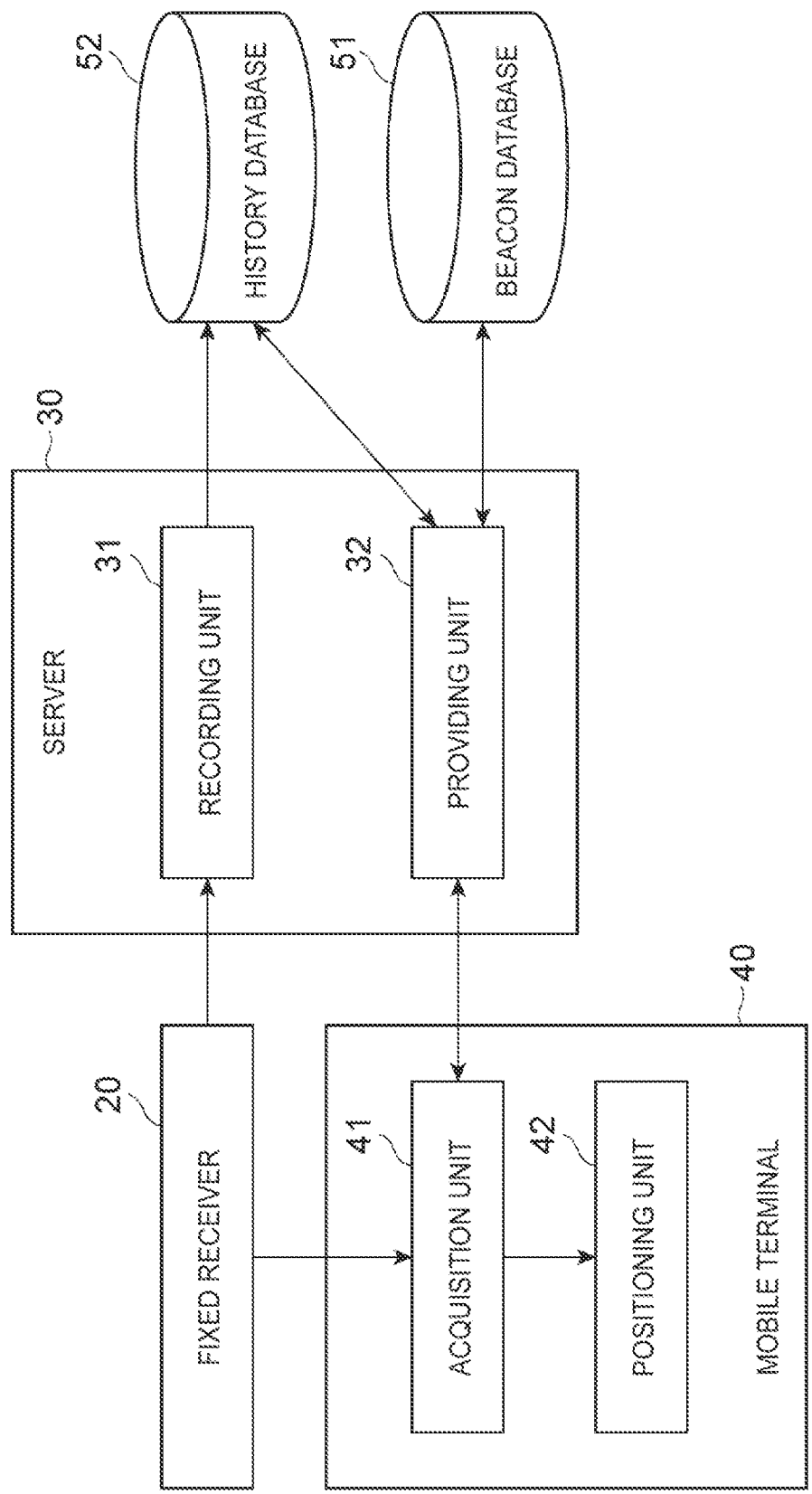
FIG. 4 is a block diagram illustrating the functional configuration of the positioning system according to the first embodiment.

Next, each functional component of the server 30 will be described. As illustrated in FIG. 4, the server 30 includes, as functional components, a recording unit (first acquisition unit) 31 and a providing unit (second acquisition unit, responding unit) 32.

The recording unit 31 is a functional component for receiving a reception log from each fixed receiver 20 and storing the reception log in the history database 52.

The providing unit 32 is a functional component for providing information necessary for positioning at the mobile terminal 40 in response to a request from the mobile terminal 40. First, the providing unit 32 receives a receiver ID of a fixed receiver 20 from a mobile terminal 40 communicating with the fixed receiver 20. Then, the providing unit 32 reads, from the history database 52, the latest reception log regarding each of multiple spreading sequence IDs corresponding to the receiver ID. This means to retrieve information indicating when was the last time the fixed receiver 20 received inaudible sound from each of surrounding beacons 10 (which may also be called a "surrounding beacon group" below). Then, the providing unit 32 reads, from the beacon database 51, multiple records of beacon information corresponding to the multiple spreading sequence IDs corresponding to the reception log acquired. Thus, the providing unit 32 acquires beacon information on multiple beacons 10 installed near the mobile terminal 40 and corresponding to the fixed receiver 20. Then, the providing unit 32 transmits, to the mobile terminal 40, beacon information and the reception log regarding the surrounding beacon group as auxiliary information.

In the embodiment, the mobile terminal 40 needs to receive inaudible sound from at least four beacons 10 in order to perform positioning. Therefore, in the embodiment, it is assumed that the "surrounding beacon group" contains at least four beacons 10 and the auxiliary information contains beacon information and the reception log regarding at least the four beacons 10.

Next, each functional component of the mobile terminal 40 will be described. As illustrated in FIG. 4, the mobile terminal 40 includes, as functional components, an acquisition unit (second acquisition unit, requesting unit) 41 and a positioning unit 42. These functional components are implemented by manually or automatically executing a program (a terminal program P2 to be described later) installed inside the mobile terminal 40.

The acquisition unit 41 is a functional component for acquiring, from the server 30, information necessary for positioning. The acquisition unit 41 wirelessly communicates with a fixed receiver 20 installed near the mobile terminal 40 to acquire, from the fixed receiver 20, the receiver ID of the fixed receiver 20. Then, the acquisition unit 41 transmits the receiver ID to the server 30, and receives and holds auxiliary information sent from the server 30 in response to this request.

The positioning unit 42 is a functional component for identifying the current location of the mobile terminal 40. The positioning unit 42 first determines an error $\Delta$ between the timer of the own device and the timer of the fixed receiver 20, and then performs positioning in consideration of the error $\Delta$. In the series of these processes, the positioning unit 42 refers to the auxiliary information (i.e., the beacon information and the reception log) held by the acquisition unit 41. The reason for taking the timer error into consideration is because, although the fixed receiver 20 and the mobile terminal 40 carry out time matching using the common NTP server, the NTP can only suppress the error up to about one second and the error has to be further reduced for positioning.

When the transmission timing of inaudible sound received by the fixed receiver 20 is expressed as $ti=ai+b$, the transmission timing of inaudible sound received by the mobile terminal 40 is expressed as $ti=ai+b+\Delta$. The positioning unit 42 first determines this error $\Delta$. The positioning unit 42 receives inaudible sound only for a fixed time (e.g., for one to two seconds) from the surrounding beacon group. Then, the positioning unit 42 refers to the beacon information to identify the signal source of each inaudible sound and obtain the reception time of each inaudible sound using the timer of the own device in order to acquire each of multiple pairs of spreading sequence IDs and reception times. This pair is a reception log of inaudible sound at the mobile terminal 40. Then, the positioning unit 42 determines the error $\Delta$ based on the reception log held by the acquisition unit 41 (the reception time at the fixed receiver 20), the acquired pair (the reception time at the mobile terminal 40), and the transmission timing indicated in the beacon information.

Then, the positioning unit 42 newly receives inaudible sound from the surrounding beacon group to perform positioning in the same manner as a GPS (Global Positioning System).

Specifically, the positioning unit 42 first executes the following steps 1 to 3 on each individual inaudible sound to determine distance between each beacon 10 and the mobile terminal 40:

1. The beacon information is referred to identify the signal source (beacon 10) and the transmission time of the inaudible sound. When the defining equation for transmission timing is used, the error $\Delta$ is taken into consideration.

2. A difference between the transmission time obtained in consideration of the error $\Delta$ and the reception time of the inaudible sound obtained by the timer of the own device is acquired as a propagation time.

3. The sound speed and the propagation time are multiplied to determine the distance to the beacon 10.

Then, the positioning unit 42 uses the distance from each beacon 10 and the installation position (x, y, z) of each beacon obtained from the beacon information to determine the current location of the mobile terminal 40 by hyperbolic navigation.

Finally, the positioning unit 42 outputs the determined current location, but the output mode is not limited at all. For example, the positioning unit 42 may display the current location on a screen, store the current location in a memory inside the mobile terminal 40, or transmit the current location to any other information processing apparatus.

Figure 5:
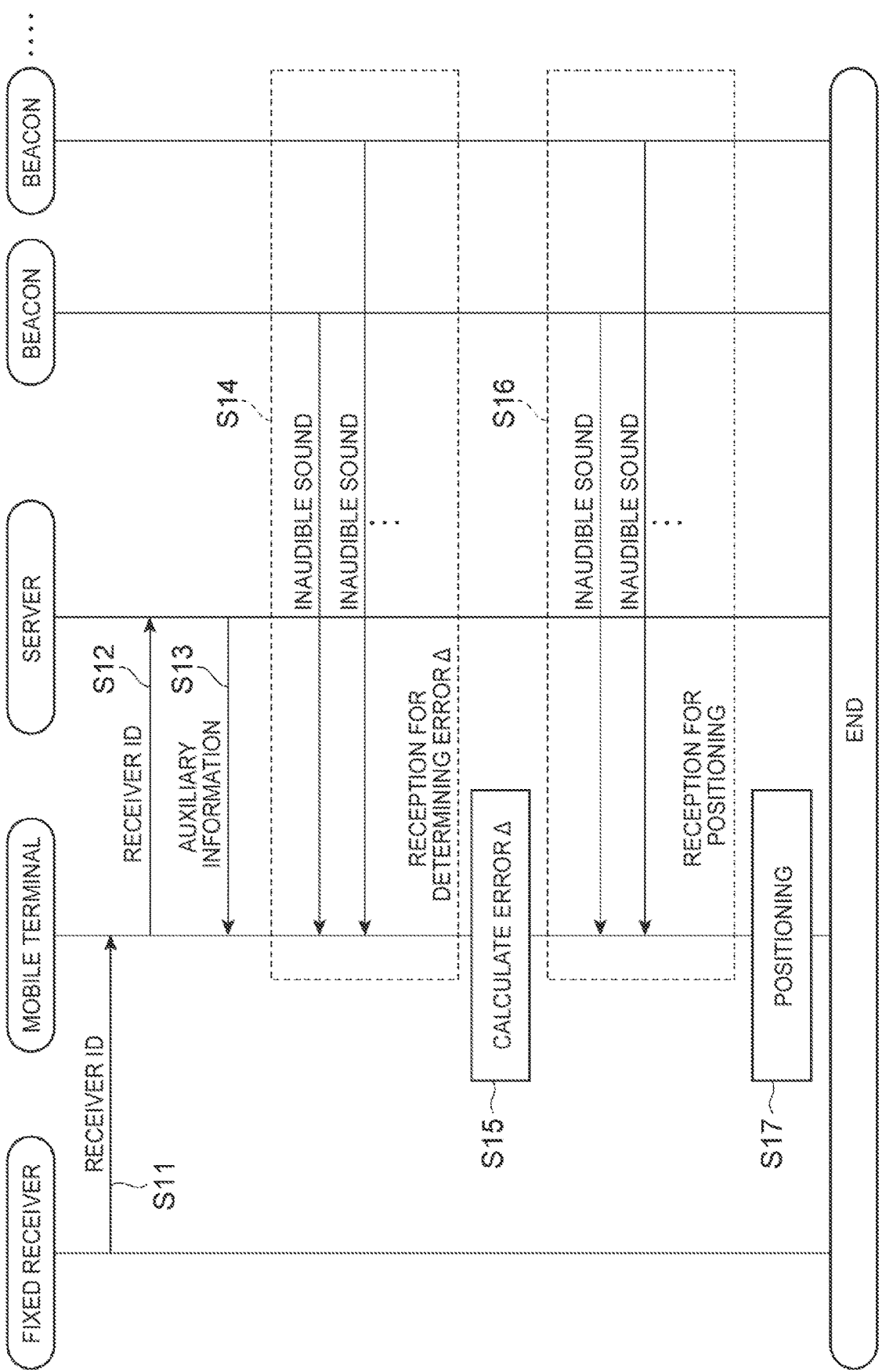
FIG. 5 is a sequence diagram illustrating the operation of the positioning system according to the first embodiment.

Referring next to FIG. 5, a positioning method according to the embodiment will be described while describing the operation of the positioning system 1. The following will describe processing from a time point when the mobile terminal 40 starts communication connection with a fixed receiver 20 on the assumption that a reception log generated by the fixed receiver 20 is accumulated in the history database 52 (first acquisition step).

In the mobile terminal 40, the acquisition unit 41 receives a receiver ID from the fixed receiver 20 (step S11), and then transmits the receiver ID to the server 30 (step S12). In the server 30, the providing unit 32 reads beacon information and the reception log corresponding to the receiver ID from the beacon database 51 and the history database 52, and transmits these pieces of information to the mobile terminal 40 as auxiliary information (step S13: second acquisition step). The acquisition unit 41 receives and holds the auxiliary information.

Then, the positioning unit 42 receives inaudible sound from a surrounding beacon group to determine a timer error $\Delta$ between the mobile terminal 40 and the fixed receiver 20 (step S14). Then, the positioning unit 42 determines the error $\Delta$ based on the reception time at the mobile terminal 40, the reception log (the reception time at the fixed receiver 20), and the beacon information (transmission timing) (step S15).

Then, the positioning unit 42 receives the inaudible sound from the surrounding beacon group again to perform positioning (step S16). Then, the positioning unit 42 performs positioning based on the reception time and the beacon information (transmission timing in consideration of the error $\Delta$) (step S17: positioning step). The positioning unit 42 may repeatedly perform positioning processing illustrated at steps S16 and S17. In this case, the moving route of the user can be determined.

Figure 6:
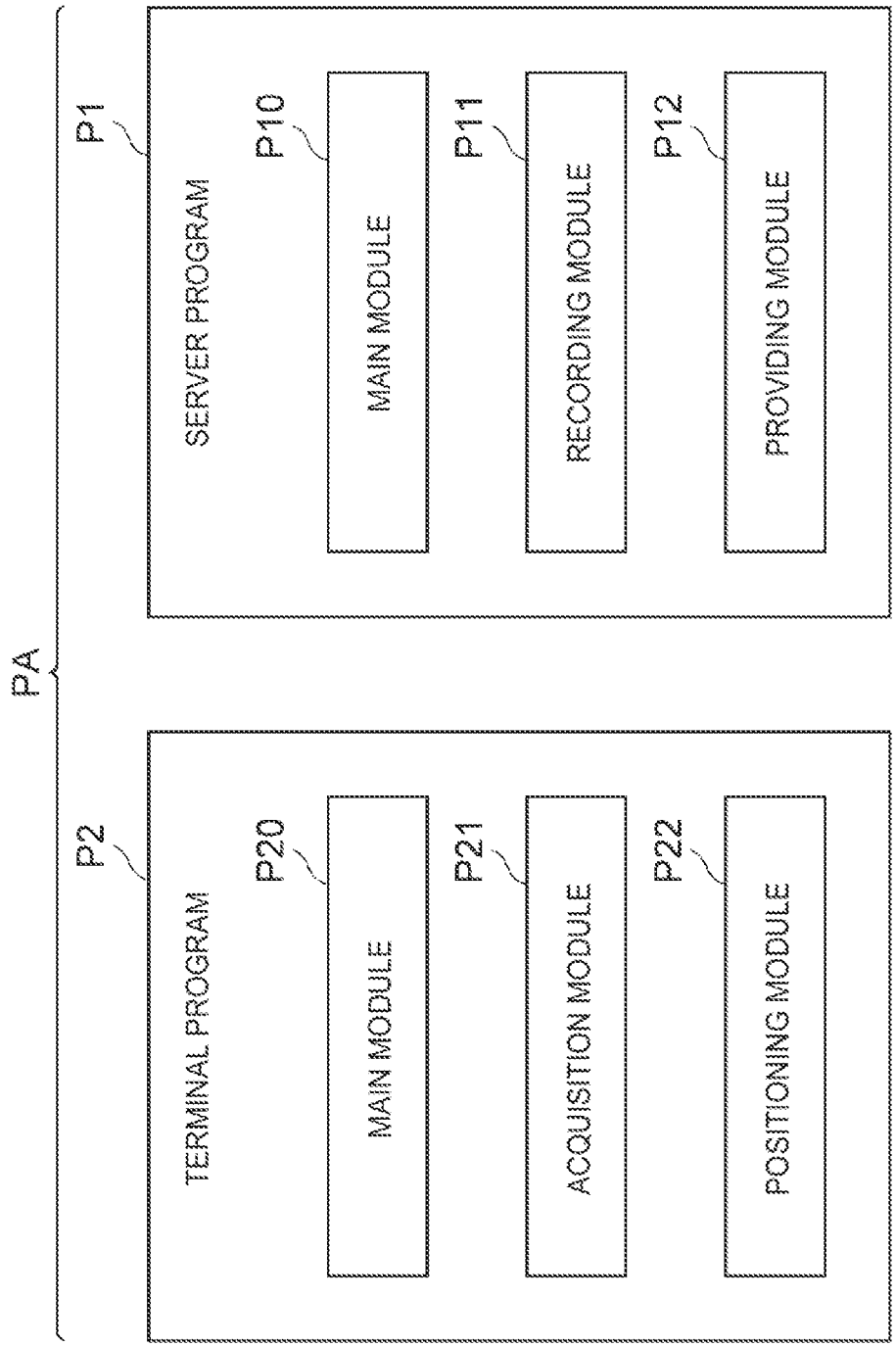
FIG. 6 is a diagram illustrating the configuration of a positioning program according to the first embodiment.

Referring next to FIG. 6, a positioning program PA for causing a computer system including one or more computers to function as the positioning system 1 will be described.

The positioning program PA includes a server program P1 for causing a computer to function as the server 30, and a terminal program P2 for causing a computer to function as the mobile terminal 40.

The server program P1 includes a main module P10, a recording module P11, and a providing module P12. The main module P10 is a piece of the program to totally control the function of the server 30. Functions implemented by executing the recording module P11 and the providing module P12 are the same as the functions of the recording unit 31 and the providing unit 32 mentioned above, respectively.

The terminal program P2 includes a main module P20, an acquisition module P21, and a positioning module P22. The main module P20 is a piece of the program to totally control the positioning function of the mobile terminal 40. Functions implemented by executing the acquisition module P21 and the positioning module P22 are the same as the functions of the acquisition unit 41 and the positioning unit 42 mentioned above, respectively.

The server program P1 and the terminal program P2 may be provided in the form of being recorded fixedly on physical recording media such as CD-ROM, DVD ROM, semiconductor memory, and the like, respectively. These programs P1 and P2 may also be provided through a communication network as data signals superimposed on a carrier.

As described above, according to the embodiment, inaudible sound only has to be spread by the spreading sequence unique to a specific beacon 10, and there is no need to embed, in the inaudible sound, information such as the transmission timing of the beacon 10. Further, even when signals temporally overlap by the spread spectrum, the signals can be detected. Since the mobile terminal 40 acquires, from the beacon database 51, the transmission timing of inaudible sound at each beacon 10, there is no need to synchronize the mobile terminal 40 with multiple beacons 10, and it is enough for the beacon 10 only to transmit inaudible sound at predetermined timing. This can simplify the mechanism of the beacon 10, and hence the costs of many beacons 10 required to be installed can be suppressed by that amount. As a result, the introduction cost of the positioning system 1 can be reduced as a whole.

Further, in the embodiment, the timer error between the fixed receiver 20 and the mobile terminal 40 is determined to calculate the current location of the mobile terminal 40 using transmission timing in consideration of the error. Specifically, the time error between the devices is suppressed within a range of about one second by time adjustment using the NTP, and further the timer error is determined based on the reception logs of the fixed receiver 20 and the mobile terminal 40, and the transmission timing of each beacon 10. Thus, since the transmission timing of inaudible sound from each beacon 10 can be obtained with a smaller error (e.g., an error of 10 milliseconds or less), the amount of calculation for detecting a signal emitted by each beacon 10 can be reduced.

Further, in the embodiment, the mobile terminal 40 includes the positioning unit 42. This means that the mobile terminal 40 has the function of receiving inaudible sound. Since the mobile terminal 40 serves as a receiving device, there is no need to use a dedicated receiving terminal having a positioning function, and hence the cost of the positioning system 1 can be reduced as a whole.

Further, in the embodiment, since the mobile terminal 40 acquires only necessary beacon information from the server 30, the memory consumption of the mobile terminal 40 to store beacon information can be suppressed.

When beacons 10 are identified from inaudible sound generated by DSSS like in the embodiment, the computational load on the receiving side increases. In this case, if the mobile terminal 40 identifies beacons 10 in such a situation that there is no constraint, it will be necessary to increase the performance of the mobile terminal 40 considerably. However, in the embodiment, since the mobile terminal 40 uses the transmission timing of the surrounding beacon group obtained from the server 30, the computational load for identifying beacons 10 can be reduced significantly (e.g., 1/10 or less).

Further, in the embodiment, the server 30 receives the reception log of inaudible sound at the fixed receiver 20 and records the reception log in the history database 52. Therefore, there is no need to continue to record inaudible sound on the mobile terminal 40, and hence the processing load on the mobile terminal 40 can be reduced by that amount.

Second Embodiment

A positioning system 2 according to a second embodiment uses the theory of Doppler shift to identify the location of a user in a space narrow in width and hence strongly limiting the moving direction of the user (e.g., a passageway of 3 m or less in width). The embodiment can be applied to processing (check-in) for identifying that a user visits a facility. In the following, only points different from the first embodiment will be particularly described to omit the description of the other points.

Figure 7:
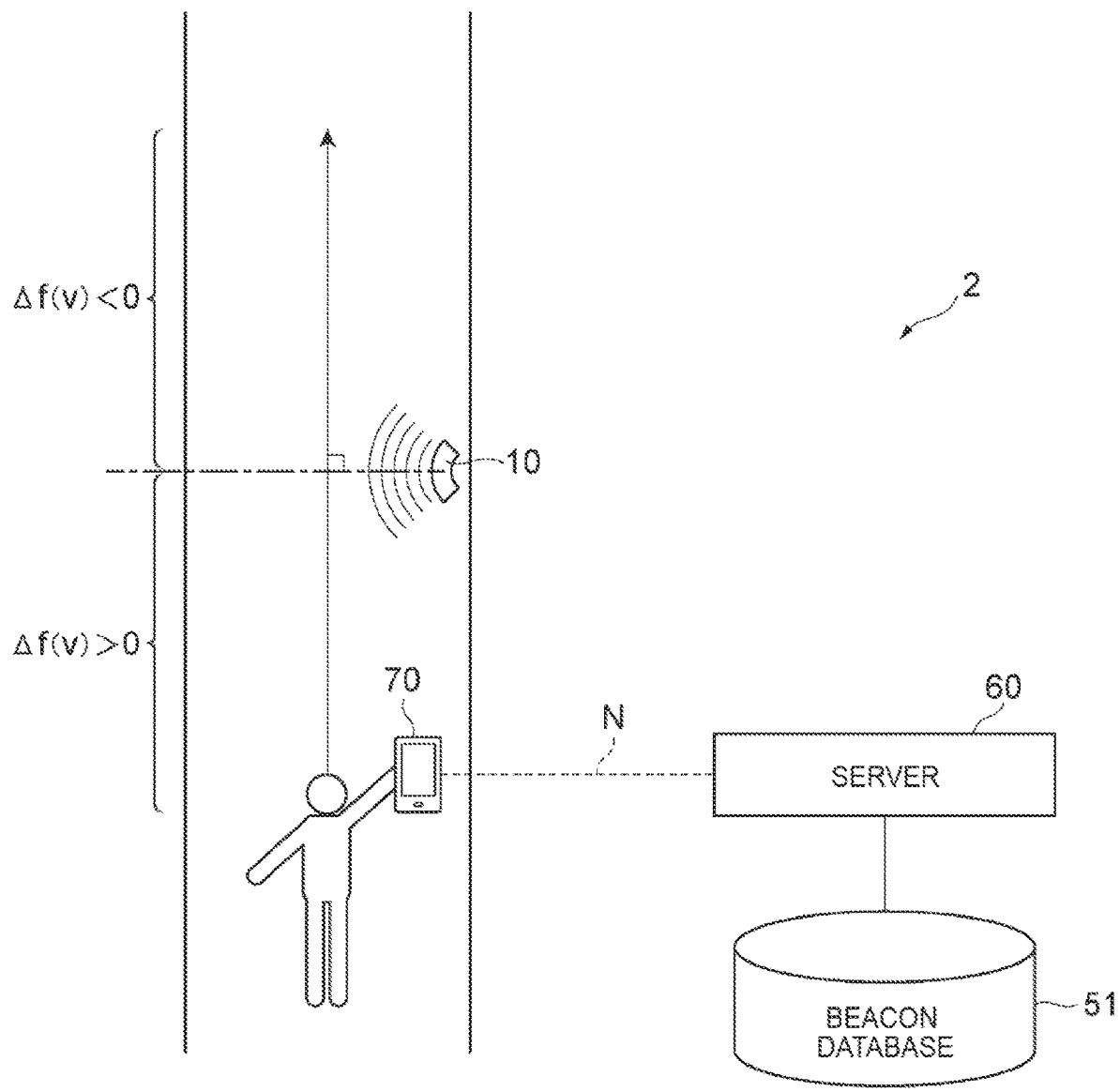
FIG. 7 is a diagram illustrating the general configuration of a positioning system according to a second embodiment.

As illustrated in FIG. 7, it is only necessary for the positioning system 2 to include beacons 10, a server 60, and a mobile terminal 70 without the need to include the fixed receiver 20. The history database 52 is also unnecessary. The beacons 10 are provided one at each place to identify whether a user passes by the place. When the moving route of the user is to be identified, the beacons 10 have only to be installed at predetermined intervals along the passageway.

Figure 8:
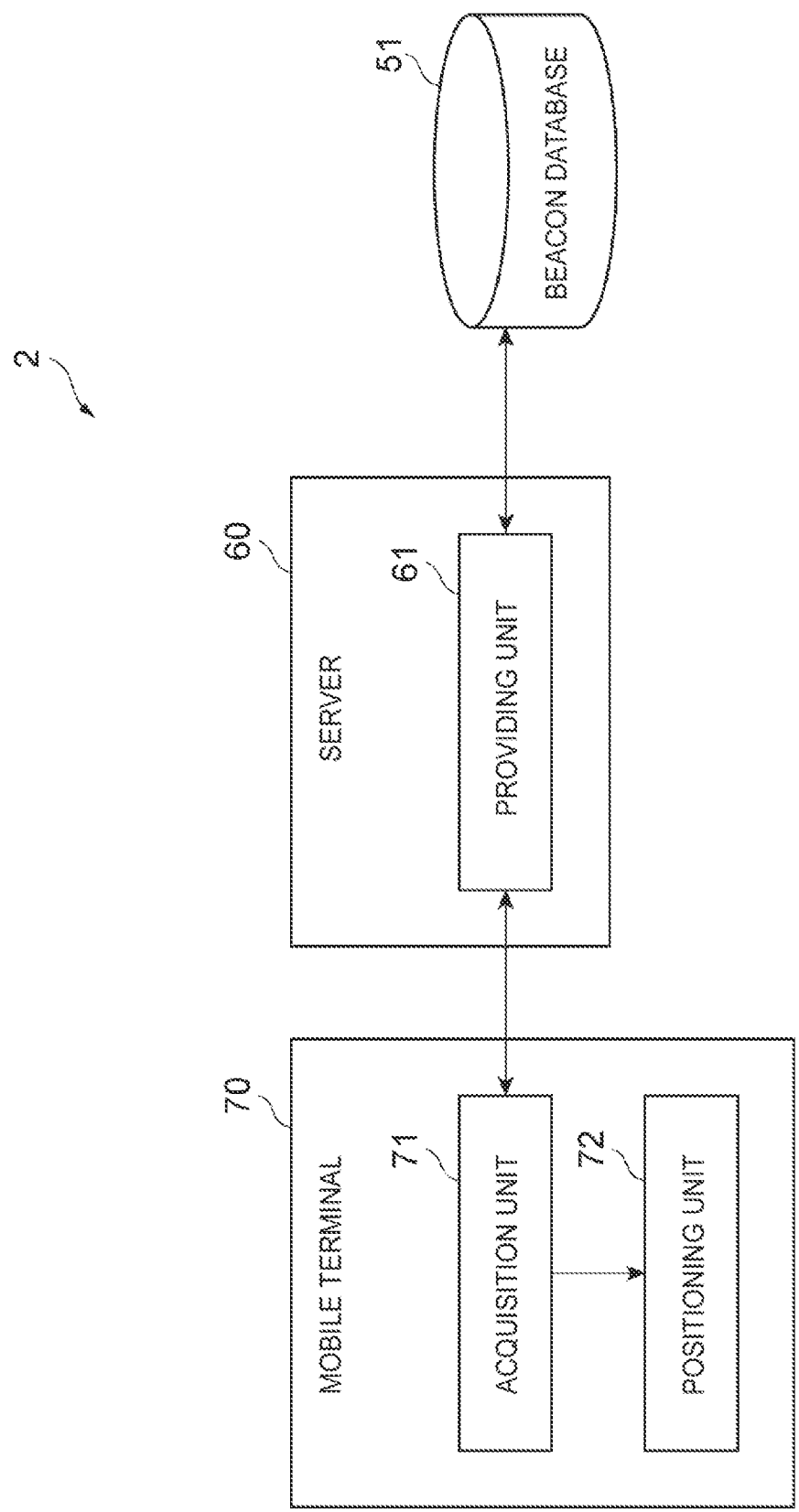
FIG. 8 is a block diagram illustrating the functional configuration of the positioning system according to the second embodiment.

As illustrated in FIG. 8, the server 60 includes a providing unit 61 as a functional component. The providing unit 61 is a functional component for transmitting, to the mobile terminal 70, beacon information on all beacons in the beacon database 51. In other words, the providing unit 61 provides a copy of the beacon database 51 to the mobile terminal 70. The providing unit 61 can transmit the beacon information only at required timing. For example, the providing unit 61 transmits the beacon information when the mobile terminal 70 makes a request for the beacon information, when the beacon database 51 is updated, or the like.

As illustrated in FIG. 8, the mobile terminal 70 includes an acquisition unit 71 and a positioning unit 72. These functional components are implemented by manually or automatically executing a program (a terminal program P4 to be described later) installed inside the mobile terminal 70.

The acquisition unit 71 is a functional component for acquiring beacon information from the server 60. The acquisition unit 71 receives and holds beacon information sent from the server 60 by either pull delivery or push delivery.

The positioning unit 72 is a functional component for identifying the current location of the mobile terminal 70. When the reception of inaudible sound from a beacon 10 is started, the positioning unit 72 first refers to the beacon information to identify the signal source (beacon 10) of the inaudible sound. This means that the positioning unit 72 acquires the installation position of the beacon 10. After that, the positioning unit 72 repeatedly determines, at predetermined intervals, a shift amount Δf(v) of the Doppler shift of the inaudible sound being continuously received. As illustrated in FIG. 7, when the receiver (mobile terminal 70) is approaching the signal source (beacon 10), the shift amount Δf(v) is a positive value, while when the receiver (mobile terminal 70) then begins to move away from the signal source (beacon 10), the shift amount Δf(v) becomes a negative value. Using this principle, the positioning unit 72 acquires the time point when the shift amount changes from the positive value to the negative value to estimate that the identified installation position of the beacon 10 is the current location of the mobile terminal 70 at the time. Finally, the positioning unit 72 outputs the estimated current location by an arbitrary method.

Here, in the embodiment, since no defining equation of transmission timing is used, the defining equation may not be contained in the beacon information.

Figure 9:
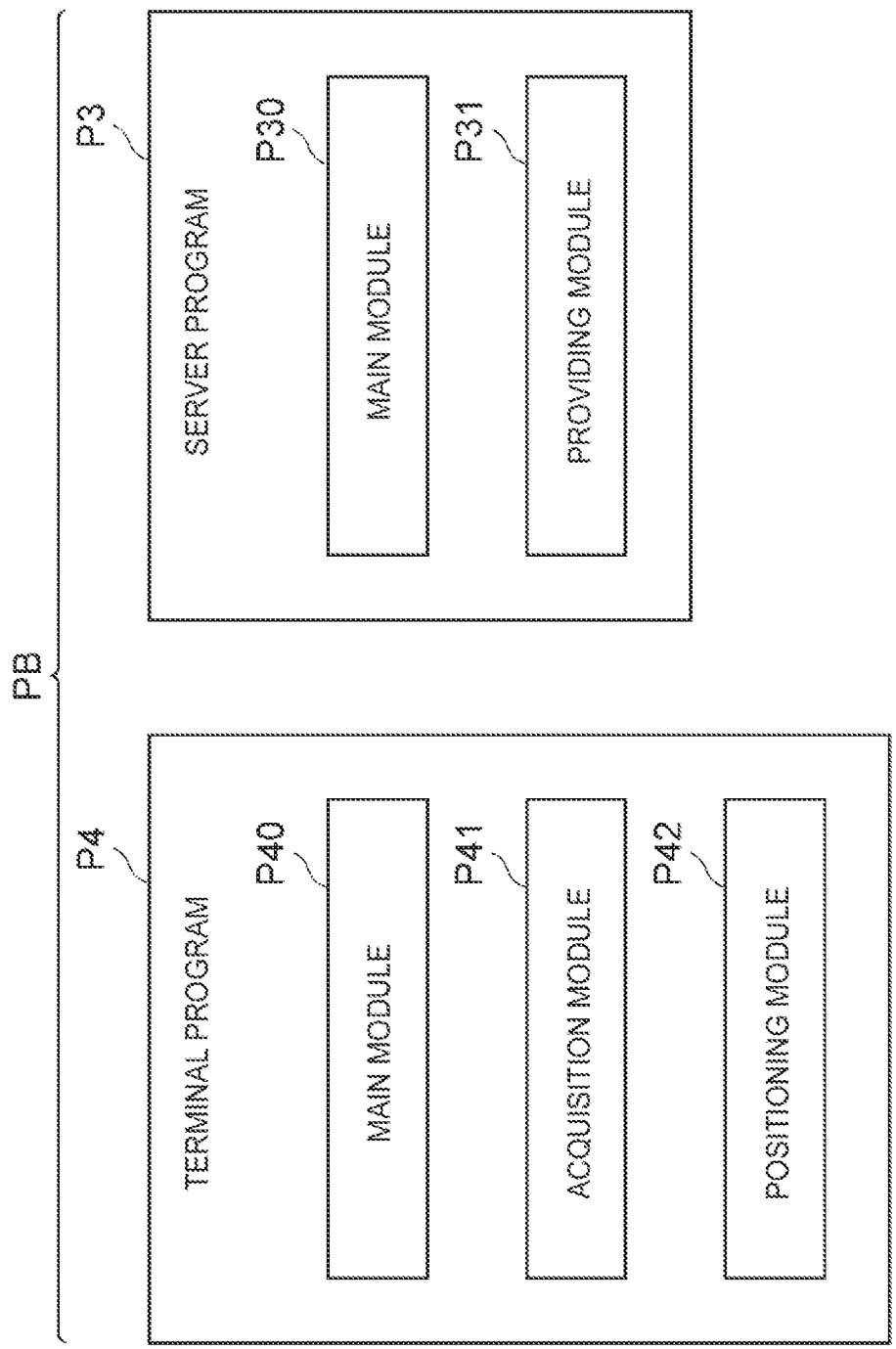
FIG. 9 is a diagram illustrating the configuration of a positioning program according to the second embodiment.

Referring next to FIG. 9, a positioning program PB for causing a computer system including one or more computers to function as the positioning system 2 will be described. The positioning program PB includes a server program P3 for causing a computer to function as the server 60, and a terminal program P4 for causing a computer to function as the mobile terminal 70. The method of distributing the positioning program PB is the same as that of the positioning program PA in the first embodiment.

The server program P3 includes a main module P30 and a providing module P31. The main module P30 is a piece of the program to totally control the function of the server 60. A function implemented by executing the providing module P31 is the same as the function of the providing unit 61 mentioned above.

The terminal program P4 includes a main module P40, an acquisition module P41, and a positioning module P42. The main module P40 is a piece of the program to totally control the positioning function of the mobile terminal 70. Functions implemented by executing the acquisition module P41 and the positioning module P42 are the same as the functions of the acquisition unit 71 and the positioning unit 72 mentioned above, respectively.

As described above, according to the embodiment, it is only necessary to acquire the location information on a beacon 10 and observe the shift amount of the Doppler shift of inaudible sound from the beacon 10 in order to be able to estimate the current location of the mobile terminal 70 based on these pieces of information. Therefore, it can be said that the positioning method in the embodiment is very simple. Further, since there is no need to provide any fixed receiver, the introduction cost of the positioning system 2 can be reduced by that amount.

The present invention has been described in detail based on the embodiments. However, the present invention is not limited to the aforementioned embodiments. The present invention can be modified in various ways without departing from the scope of the invention.

In the first embodiment, when the mobile terminal 40 receives a receiver ID from the fixed receiver 20, positioning processing is started by transmitting the receiver ID to the server 30. However, the timing of starting the positioning processing is not limited thereto. For example, when GPS information is acquired indoors or when location information is acquired from a Wi-Fi access point other than the fixed receiver 20, the mobile terminal 40 may start positioning processing by transmitting the GPS information or location information to the server 30. In this variation, the providing unit 32 of the server 30 compares the GPS information or location information with information on fixed receivers 20 held in advance (i.e., the ID and installation position of each of the fixed receivers) to identify a fixed receiver 20 installed near the mobile terminal 40. Then, the providing unit 32 uses the receiver ID of the identified fixed receiver 20 to extract and transmit auxiliary information to the mobile terminal 40 like in the first embodiment mentioned above.

A positioning system configured in combination of the first and second embodiments also falls within the scope of the present invention. In other words, the configuration may be such that the positioning method of the first embodiment is used in a space large in width and depth (e.g., a room), and the positioning method of the second embodiment is used in a space narrow in width (e.g., a passageway). In this case, the mobile terminal and the server include both of the functional components described in the first and second embodiments, respectively.

The techniques of the first and second embodiments may also be used to correct the current location determined by a conventional technique such as PDR (Pedestrian Dead Reckoning) or Wi-Fi positioning. The present invention can be applied to both of independent positioning and correction for the positioning.

In the first and second embodiments, the positioning system includes a mobile terminal and a server, but the system is not necessarily of a client/server type. If the mobile terminal is sophisticated, the function of the server 30, 60 may be implemented on the mobile terminal to omit the server. Further, in the first embodiment, the positioning system includes a fixed receiver and a server, but the fixed receiver and the server may be integrated.

Third Embodiment

In the first embodiment, there is the method of carrying out time matching based on the reception log of a sound signal at the fixed receiver 20, the reception log of a sound signal at the mobile terminal 40, and the transmission timing of each beacon 10 mentioned above after respective beacons 10 are synchronized with reference to the fixed receiver 20, and the fixed receiver 20 and the mobile terminal 40 carry out time matching using the common NTP server. However, the time matching method is not limited to the above-mentioned method. For example, a method to be illustrated below can be employed.

In a third embodiment, time matching (timer error adjustment) between a mobile terminal 90 and each beacon (signal source) 100 will be described. In the following, only points different from the first embodiment and the second embodiment will be particularly described to omit the description of the other points.

Figure 10:
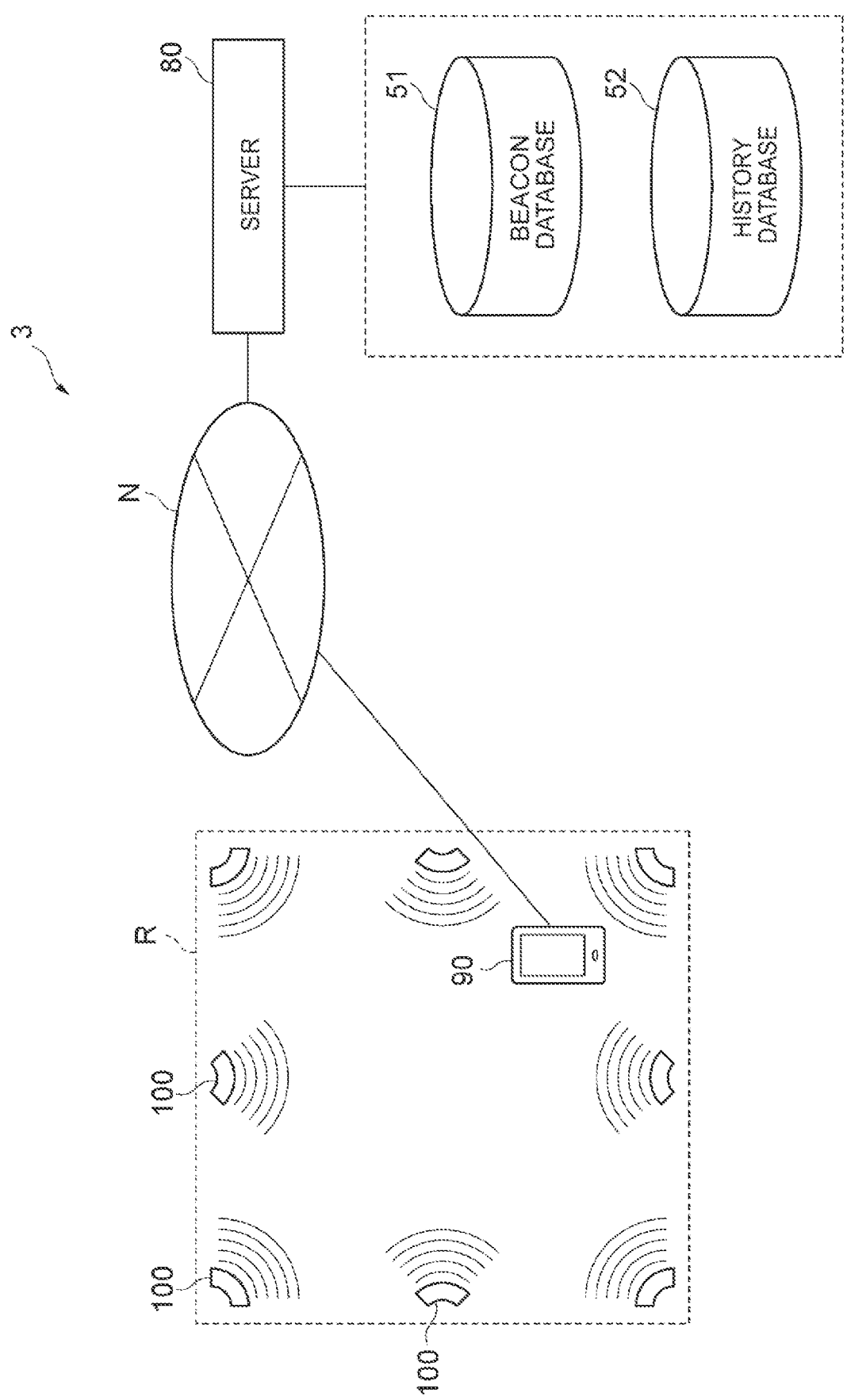
FIG. 10 is a diagram illustrating the general configuration of a positioning system according to a third embodiment.

FIG. 10 is a diagram illustrating the general configuration of a positioning system 3 according to the third embodiment. As illustrated in FIG. 10, the positioning system 3 is illustratively configured to include beacons 100, a server 80, and the mobile terminal 90. A different point between the third embodiment and the first embodiment is, for example, that the positioning system 3 according to this embodiment does not include the fixed receiver 20 (for example, see FIG. 2, and the like) in the positioning system 1 according to the first embodiment.

The beacon 100 is a device for emitting inaudible sound. Each beacon 100 is a speaker with a player, which transmits the same inaudible sound signal from a crystal oscillator at fixed time intervals without synchronization with other beacons 100 (i.e., independently of the other beacons 100).

The beacon 100 also stores the current time based on a request from the server 80 in a manner to be described later. Further, the beacon 100 transmits, to the server 80, current time information stored based on an inquiry from the server 80 in a manner to be described later.

Figure 11:
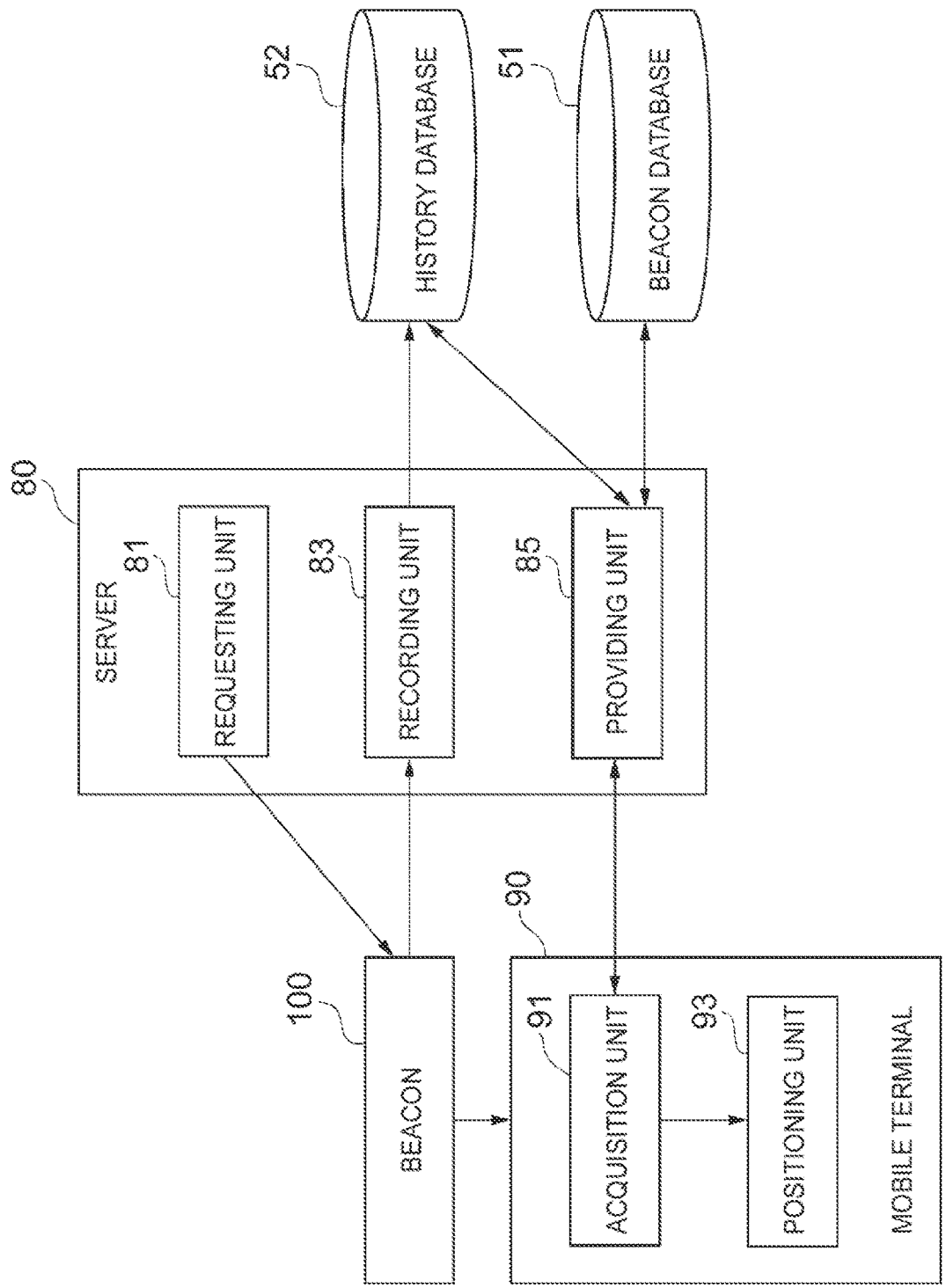
FIG. 11 is a diagram illustrating the functional configuration of the positioning system according to the third embodiment.

FIG. 11 is a diagram illustrating the functional configuration of the positioning system 3 according to the third embodiment. The server 80 is a computer for transmitting, to the mobile terminal 90, information necessary for time matching, and includes, as functional components, a requesting unit 81, a recording unit 83, and a providing unit 85. These functional components are implemented by manually or automatically executing a program (server program) installed inside the server 80. The server 80 may be composed of one computer, or two or more computers.

The requesting unit 81 is a functional component for requesting each beacon 100 to record current time information (counter value) of each beacon 100. The request originated by the requesting unit 81 is made to each beacon 100 multiple times by broadcast. Further, the requesting unit 81 is a functional component for requesting each beacon 100 to transmit the recorded current time information. The transmission request for current time information originated by the requesting unit 81 may be made for each recording request to each beacon 100 mentioned above, or may be made at any other timing.

The recording unit 83 is a functional component for receiving current time information from each beacon 100 and stores the current time information in the history database 52. As mentioned above, the history database 52 stores at least current time information on each beacon 100. Note that, since the positioning system 3 of the embodiment includes no fixed receiver 20, information on the fixed receiver 20 such as the receiver ID is not stored.

The providing unit (acquisition unit, table creation unit) 85 is a functional component for creating a transmission schedule table of each beacon 100. Specifically, the providing unit 85 acquires current time information from the history database 52. Further, the providing unit 85 acquires beacon information on each beacon 100 stored in the beacon database 51. Then, after respective beacons 100 are synchronized in terms of current time information mentioned above with reference to the current time information of an arbitrary beacon 100, transmission time information of each beacon 100 is calculated based on the beacon information (transmission timing or the like) on each beacon 100 stored in the beacon database 51 to create a transmission schedule table in which each beacon 100 is associated with transmission time information on the beacon 100. The providing unit 85 is also a functional component for transmitting the created transmission schedule table to the mobile terminal 90 in response to a request from the mobile terminal 90. Further, the providing unit 85 transmits, to the mobile terminal 90, the beacon information stored in the beacon database 51.

Next, as illustrated in FIG. 11, the mobile terminal 90 includes an acquisition unit 91 and a positioning unit 93 as functional components. These functional components are implemented by manually or automatically executing a program (terminal program) installed inside the mobile terminal 90.

The acquisition unit 91 is a functional component for acquiring a transmission schedule table created by the server 80. Further, the acquisition unit 91 makes a request to the server 80 for timer error adjustment by the positioning unit (timer error adjustment unit) 93 to be described later and information necessary for positioning, and receives and holds beacon information sent from the server 80 in response to this request.

The positioning unit (timer error adjustment unit) 93 is a functional component for carrying out time matching. The positioning unit 93 receives inaudible sound from a surrounding beacon group for a predetermined period of time (e.g., for one to two seconds). Then, the positioning unit 93 refers to the beacon information to identify the signal source of each inaudible sound, and obtains the reception time of each inaudible sound using the timer of the own device in order to acquire each of multiple pairs of spreading sequence IDs and reception times. This pair is a reception log of inaudible sound at the mobile terminal 90. Then, based on the transmission schedule table of each beacon 100 created by the server 80 and the acquired pair (the reception time at the mobile terminal 40), the positioning unit 93 carries out time matching (error adjustment) between the timer of the own device and the timer of each beacon 100. It is preferred that the time matching mentioned above should be carried out periodically, because a timer deviation can occur between the mobile terminal 90 and the beacon 100 as time proceeds. The positioning unit 93 is also a functional component for identifying the current location of the mobile terminal 90. Since this function of the positioning unit 93 is the same as the function of the positioning unit 42 or the positioning unit 72 mentioned above, the description thereof will be omitted.

Figure 12:
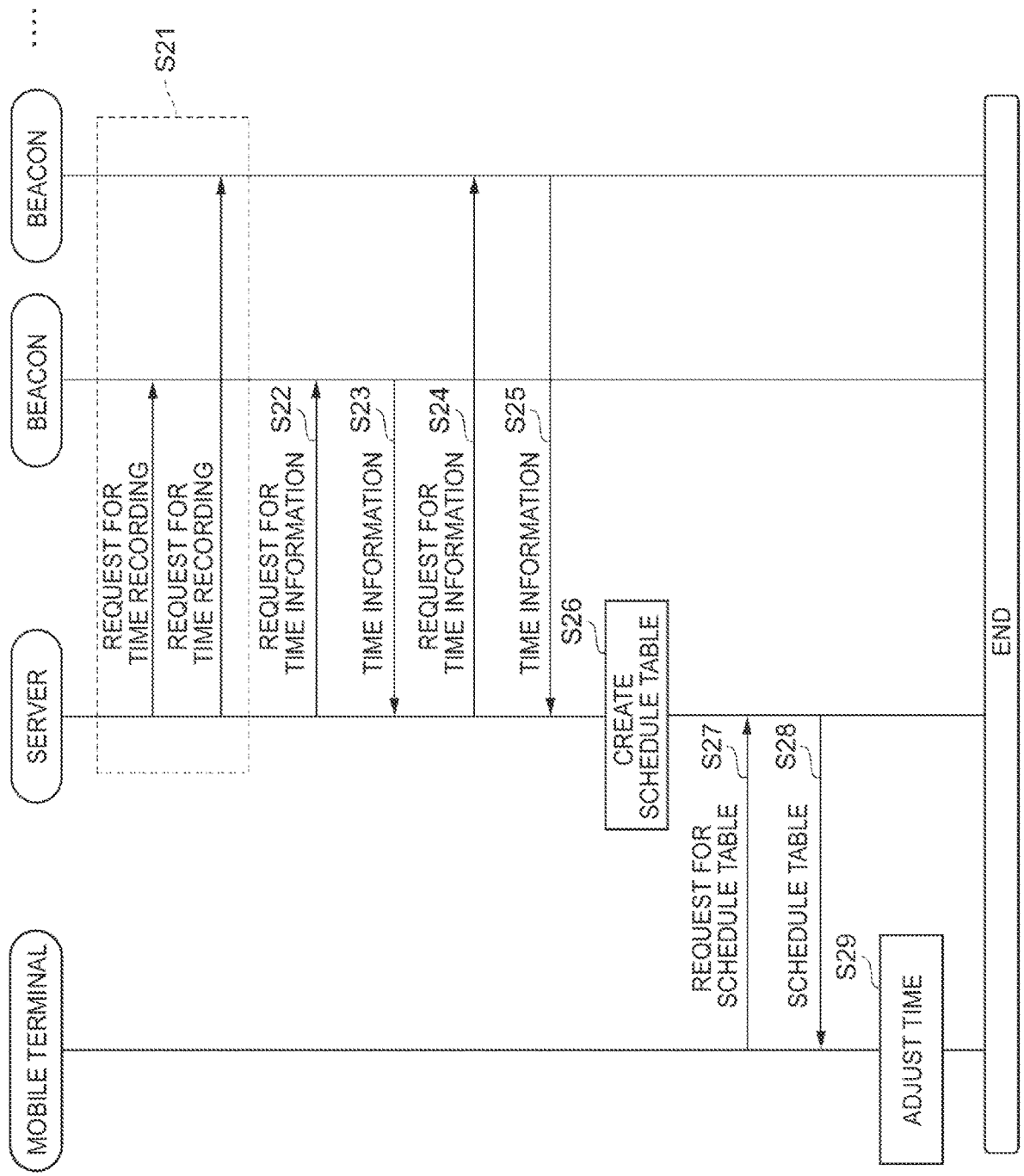
FIG. 12 is a sequence diagram illustrating the operation of the positioning system according to the third embodiment.

FIG. 12 is a sequence diagram illustrating the operation of the positioning system 3 according to the third embodiment.

As illustrated in FIG. 12, the server 80 first requests each beacon 100 to record the current time by means of broadcast (step S21).

The server 80 makes an inquiry to a certain beacon 100 about the current time information (step S22). The beacon 100 transmits the recorded time information to the server 80 (step S23).

Next, the server 80 makes an inquiry to another beacon 100 about the current time information (step S24). The beacon 100 transmits the recorded time information to the server 80 (step S25).

The server 80 creates a transmission schedule table based on the current time information received from each beacon 100 and beacon information on each beacon 100 (step S26).

The mobile terminal 90 makes a request to the server 80 for the transmission schedule table (step S27).

The server 80 transmits the transmission schedule table in response to the request from the mobile terminal 90 (step S28).

The mobile terminal 90 refers to the transmission schedule table and the beacon information to make a time adjustment (step S29).

Note that the server 80 connects with the beacon 100 and the mobile terminal 90 through the communication network N, respectively. The specific configuration of the communication network N is not particularly limited. For example, the communication network N may be constructed by either or both of a wired network and a wireless network (e.g., Wi-Fi). The communication network N may also be constructed by either or both of the Internet and the LAN.

Since the third embodiment is configured as mentioned above, the server 80 can predict the transmission timing of inaudible sound of each beacon 100 (i.e., create a transmission schedule table), and hence the positioning system 3 can be configured without any constraint of the installation position of the fixed receiver 20 like in the first embodiment.

The server program and the terminal program may be provided in the form of being recorded fixedly on physical recording media such as CD-ROM, DVD ROM, semiconductor memory, and the like, respectively. These programs may also be provided through a communication network as data signals superimposed on a carrier.

Further, as described above, the positioning unit 42, 93 can determine the current location of the mobile terminal 40, 90 by hyperbolic navigation using the distance from each beacon 10, 100 and the installation position (x, y, z) of each beacon obtained from the beacon information, but the present invention is not limited thereto, and it may also be configured to be able to determine the moving speed of the mobile terminal 40, 90.

Further, the positioning system 3 includes the mobile terminal 90 and the server 80 in the third embodiment, but the system is not necessarily of a client/server type. The function of the server 80 can also be implemented on the mobile terminal 90 to omit the server 80. Further, in the third embodiment, the positioning system 3 does not include the fixed receiver 20 in the first embodiment, but the system may also be configured such that the server 80 partially or wholly includes the function of the fixed receiver 20.

DESCRIPTION OF REFERENCE NUMERALS

1, 2 . . . positioning system, 10 . . . beacon (signal source), 20 . . . fixed receiver, 30 . . . server, 31 . . . recording unit (first acquisition unit), 32 . . . providing unit (second acquisition unit, responding unit), 40 . . . mobile terminal, 41 . . . acquisition unit (second acquisition unit, requesting unit), 42 . . . positioning unit, 51 . . . beacon database, 52 . . . history database, 60 . . . server, 61 . . . providing unit, 70 . . . mobile terminal, 71 . . . acquisition unit, 72 . . . positioning unit, 80 . . . server, 81 . . . requesting unit, 83 . . . storage unit, 85 . . . providing unit, 90 . . . mobile terminal, 91 . . . acquisition unit, 93 . . . positioning unit, 100 . . . beacon (signal source), PA, PB . . . positioning program, P1 . . . server program, P10 . . . main module, P11 . . . recording module, P12 . . . providing module, P2 . . . terminal program, P20 . . . main module, P21 . . . acquisition module, P22 . . . positioning module, P3 . . . server program, P30 . . . main module, P31 . . . providing module, P4 . . . terminal program, P40 . . . main module, P41 . . . acquisition module, P42 . . . positioning module.

The invention claimed is:

1. A positioning system comprising:
a plurality of signal sources configured to emit a plurality of inaudible sounds;
a fixed receiver configured to receive the plurality of inaudible sounds from the plurality of signal sources and generate a first reception log;
a server configured to acquire, from the fixed receiver, the first reception log, to acquire, from a storage unit, signal source information on each of the plurality of signal sources corresponding to the fixed receiver, and to transmit the signal source information and the first reception log to a mobile terminal, wherein the signal source information contains information for identifying each of the plurality of signal sources, transmission timing of inaudible sound at each of the plurality of signal sources, and a location of each of the plurality of signal sources; and
the mobile terminal configured to receive inaudible sounds, to identify signal sources that emit the inaudible sounds received by the mobile terminal based on the signal source information received from the server, and to determine a current location of the mobile terminal using the signal source information on the identified signal sources, the first reception log, and a second reception log of the inaudible sounds at the mobile terminal,
wherein the first reception log includes information for identifying the fixed receiver, information for identifying the plurality of signal sources, and reception times of the plurality of inaudible sounds at the fixed receiver, and
wherein, when each of timers of the identified signal sources used for determining the current location of the mobile terminal has an error with respect to a timer of the mobile terminal, the error of each of the timers is adjusted using the second reception log.

2. The positioning system according to claim 1, wherein the mobile terminal determines a timer error between the fixed receiver and the mobile terminal based on the first reception log received from the server and the second reception log, and determines the current location of the mobile terminal using the transmission timing in consideration of the timer error.

3. The positioning system according to claim 1, wherein the mobile terminal transmits a receiver ID of the fixed receiver to the server,
the server receives the receiver ID from the mobile terminal, acquires, from the storage unit, the signal source information corresponding to the receiver ID, and transmits the signal source information to the mobile terminal.

4. The positioning system according to claim 1, wherein the mobile terminal includes a further positioning function to be executed when the mobile terminal receives one inaudible sound, and
the further positioning function includes:
a step of identifying, based on the signal source information, a location of one signal source that emits the one inaudible sound;
a step of repeatedly determining a shift amount of Doppler shift of the one inaudible sound; and
a step of estimating the location of the one signal source as a current location of the mobile terminal at a time point when the shift amount changes from a positive value to a negative value.

5. A positioning method executed by a positioning system including a fixed receiver, a plurality of signal sources, and a mobile terminal, the method comprising:
a first acquisition step of acquiring, from the fixed receiver, a first reception log indicating that the fixed receiver receives a plurality of inaudible sounds, the plurality of inaudible sounds being emitted from the plurality of signal sources;
a second acquisition step of acquiring, from a storage unit, signal source information on the plurality of signal sources corresponding to the fixed receiver, wherein the signal source information contains information for identifying each of the plurality of signal sources, transmission timing of inaudible sound at each of the plurality of signal sources, and a location of each of the plurality of signal sources; and
a positioning step of identifying signal sources that emit inaudible sounds received by the mobile terminal based on the signal source information acquired in the second acquisition step, and determining a current location of the mobile terminal using the signal source information on the identified signal sources, the first reception log, and a second reception log of the inaudible sounds at the mobile terminal, wherein the first reception log includes information for identifying the fixed receiver, information for identifying the plurality of signal sources, and reception times of the plurality of inaudible sounds at the fixed receiver, and wherein, when each of timers of the identified signal sources used for determining the current location of the mobile terminal has an error with respect to a timer of the mobile terminal, the error of each of the timers is adjusted using the second reception log.

6. A positioning system for positioning a location of a mobile terminal, the system comprising:

a plurality of signal sources configured to emit a plurality of inaudible sounds;

a server configured to provide a request to the plurality of signal sources for current time information on the plurality of signal sources, to acquire, from a storage unit, signal source information on the plurality of signal sources, wherein the signal source information contains information for identifying a signal source from each of inaudible sounds emitted by the plurality of signal sources, and to create a transmission schedule table of inaudible sound of each of the plurality of signal sources based on the current time information from each of the plurality of signal sources and the signal source information for identifying each of the plurality of signal sources, and to transmit the transmission schedule table to the mobile terminal, the transmission schedule table including transmission timing of the inaudible sound of each of the plurality of signal sources; and the mobile terminal configured to receive the transmission schedule table and perform time matching between the mobile terminal and each of the plurality of signal sources based on the transmission schedule table, wherein the mobile terminal adjusts a timer error between the mobile terminal and each of the plurality of signal sources based on a reception log of inaudible sound at the mobile terminal and the transmission schedule table, the reception log including a reception time of the inaudible sound at the mobile terminal.

7. The positioning system according to claim 1, wherein the information for identifying the fixed receiver includes a receiver ID of the fixed receiver and a location indicator of the fixed receiver, and the information for identifying the plurality of signal sources includes spreading sequence IDs of the plurality of inaudible sounds.

8. The positioning system according to claim 1, wherein the second reception log includes reception times of the inaudible sounds at the mobile terminal.

9. The positioning system according to claim 1, wherein the plurality of inaudible sounds have different signal waveforms so that the plurality of inaudible sounds are distinguished from each other.

10. The positioning system according to claim 1, wherein the fixed receiver, the server, and the mobile terminal have a time-matching function using network time protocol (NTP).

11. The positioning system according to claim 1, wherein the plurality of signal sources are installed in a space enclosed by walls.

12. The positioning system according to claim 1, wherein a signal source includes a speaker with a player for transmitting inaudible sound signal from a crystal oscillator and performs direction sequence spectrum on the inaudible sound signal to generate inaudible sound.

13. The positioning system according to claim 6, wherein the plurality of signal sources are installed in a space enclosed by walls.

14. The positioning system according to claim 6, wherein the plurality of inaudible sounds have different signal waveforms so that the plurality of inaudible sounds are distinguished from each other.

15. The positioning system according to claim 6, wherein the server has a time-matching function using network time protocol (NTP).

* * * * *